United States Patent [19]

Hermanek

[11] Patent Number: 5,443,658

[45] Date of Patent: Aug. 22, 1995

[54] BRAZE FILLER METAL ALLOY PASTE

[75] Inventor: Frank J. Hermanek, Indianapolis, Ind.

[73] Assignee: Praxair S.T. Technology, Inc., Danbury, Conn.

[21] Appl. No.: 257,244

[22] Filed: Jun. 8, 1994

[51] Int. Cl.⁶ ............................................ B23K 35/34
[52] U.S. Cl. ...................... 148/23; 148/24; 148/25
[58] Field of Search ................... 148/23–25

[56]  References Cited

U.S. PATENT DOCUMENTS 3,309,239  3/1967  Harris ........................... 148/23

OTHER PUBLICATIONS

Ceramic Bulletin, vol. 65, No. 4 (1986), "Making Thin, Flat Ceramics–A–Review" Edmond P. Hyatt.
Wall Colmonoy Corporation, Data Sheet No. 2.1.63, Rev. May 1972 "Nicrobraz Brazing Sheet".
Wall Colmonoy Corporation, Nicrobraz technical data sheet 2.1.60 Rev.B, "Nicrobraz and Nicrocoat Transfer Tapes".
Data sheet 2.2.2 Rev.C "Nicrobraz Cement" Vitta, Product Data Sheet Braz–Cement High Temperature Brazing Alloy Transfer Tapes.
Publication "Selection Guide: Fusion Paste Solder Fluxes".
Publication "Precision Dry–Atomized Brazing Filler Metals".

Primary Examiner—Peter D. Rosenberg
Attorney, Agent, or Firm—Cornelius F. O'Brien

[57]  ABSTRACT

A braze filler metal alloy paste containing braze metal alloy powders, such as a nickel- or cobalt-based braze filler metal, homogeneously dispersed throughout an aqueous gel solution comprising a binder such as a cellulose material, for example, sodium carboxymethylcellulose and a dispersants such as mineral oil and glycerine.

20 Claims, No Drawings

BRAZE FILLER METAL ALLOY PASTE

FIELD OF THE INVENTION

The invention relates to a braze filler metal alloy paste that comprises braze metal alloy powders dispersed in an aqueous gel solution containing a binder and a dispersant.

BACKGROUND OF THE INVENTION

Brazing is a group of welding processes wherein the filler metal is generally a non-ferrous metal or alloy whose melting point is higher than 840° F., but lower than that of the metal or alloys to be joined. At one extreme, brazing is similar to soldering and is sometimes called hard soldering. Joints to be soldered are usually designed to require a thin film of filler metal which is drawn into the joint by capillary action when the solder becomes molten. This principal is also used in brazing in that a high-temperature process uses a brazing material to join close-fitting parts, such as steel parts. Most forms of brazing depend on local heating with a torch or by other means while some brazing is generally done in a furnace in which the parts are heated to a high temperature such as 1600° F.

Another type of brazing is similar to welding in many respects and is sometimes called bronze welding. The joints are generally V-shaped in which a bead of filler metal is deposited. This technique differs from welding in that the base metal is not melted but only raised to the "tinning" temperature at which bonding takes place between the base metal and the filler metal by slight interdiffusion or alloying.

Braze filler metal pastes are generally custom blends of filler metal with a chemical neutral gel. A majority of the gels used in braze filler metal pastes employ organic solvent-based binders in which the solvent could be toluene, methyl ethyl ketone, acetone, alcohols, trichloroethane, and the like. Many of these organic solvents are hazardous to both personal health and the environment.

Brazing cements for use with powdered brazing filler metals are commercially available in many different viscosities. The brazing cement could be a liquid plastic that provides a means of applying powdered brazing filler metals in an easy-to-use liquid powder mixture. The brazing cement acts as both a vehicle and a binder so that when mixed with a powdered brazing filler metal, the mixture can be applied by a brush, eyedropper, syringe, spray gun or the like to specific areas to be bonded. The viscosity of the cement for use will depend on the amount of filler metal required in a joint area. The more viscous the cement, the more filler metal can be carried. As stated above, the majority of these cements using organic solvents that are hazardous to both personal health and the environment.

It is an object of the present invention to provide a braze filler metal paste comprising braze metal powder dispersed in an aqueous gel composed of a binder and a dispersant that is not hazardous to the environment or personal health.

Another object of the present invention is to provide a braze filler metal paste that has a suitable viscosity so that the paste can be packaged within a conventional tube container so that it can be dispersed when needed.

Another object of the present invention is to provide a braze filler metal paste that is cost effective to produce and easy to apply.

The above and further objects will become apparent upon consideration of the following description.

SUMMARY OF THE INVENTION

The invention relates to a braze filler metal alloy paste comprising at least one braze filler metal alloy powder homogeneous dispersed in an aqueous gel, said braze filler powder present in an amount from 80 to 93 weight percent based on the weight of the paste and the remainder being the aqueous gel; said gel comprising 70 to 90 weight percent water based on the weight of the gel, 7 to 27 weight percent of at least one dispersant based on the weight of the gel and 1 to 5 weight percent of at least one binder based on the weight of the gel.

As used herein, a binder is a material that is used to hold solid particles together. Suitable binders for use in this invention are various cellulose materials such as hydroxypropyl-cellulose, sodium carboxymethyl-cellulose and hydroxyethyl-cellulose.

As used herein, a dispersant is a material that facilitates or helps disperse particles, such as powders, throughout a viscous solution. Suitable dispersants for use in this invention are mineral oil, glycerin, memhaden fish oil, glycerol, trioleate, hexylene glycol and the like.

Suitable braze filler metal alloys for use in this invention include nickel-based braze filler metals, cobalt-based braze filler metals and precious metal based braze filler metals, e.g. silver, gold and palladium. Suitable samples of both nickel- and cobalt-based braze filler metals are shown in the table.

| Sample | Nominal Chemical Composition (percent by weight) | Recommended Brazing Ranges F | Recommended Brazing Ranges C |
| --- | --- | --- | --- |
| A | Ni—15Cr—3.5B | 1950–2100 | 1066–1150 |
| B | Ni—3.5Si—15Cr—22Co—2.8B | 2075–2200 | 1135–1205 |
| C | Ni—0.8C—4.5Si—14Cr—3B—4.5Fe | 1900–2200 | 1066–1204 |
| D | Ni—4.5Si—14Cr—3B—4.5Fe | 1970–2200 | 1077–1204 |
| E | Ni—4.5Si—7Cr—3B—3Fe | 1830–2150 | 1010–1177 |
| F | Ni—4.5Si—3B | 1850–2150 | 1010–1177 |
| G | Ni—3.5Si—1.8B | 1950–2150 | 1010–1177 |
| H | Ni—10Si—19Cr | 2100–2200 | 1147–1204 |
| I | Co—8Si—19Cr—17Ni—4W—0.8B | 2100–2250 | 1149–1232 |

Sample A is a silicon free filler metal alloy that is suitable for diffusion brazing applications and where service conditions cannot tolerate silicon. This alloy exhibits excellent strength and high temperature oxidation resistance.

Sample B is an excellent filler metal alloy for use in applications with tight tolerances and thin sections. The cobalt addition promotes base metal wetting and braze alloy solid solutioning. Resulting joints demonstrate excellent fatigue resistance.

Sample C filler metal alloy yields high strength joints suitable for elevated temperature applications. This alloy is recommended for the joining of gas turbine hardware.

Sample D filler metal alloy is chemically similarly to Sample C except for a lower carbon content. This alloy reduces tendencies to form carbides and since it is sluggish, it is recommended for wide gap applications in environments requiring resistance to chemical attack.

Sample E filler metal alloy, while exhibiting properties similar to those encountered with Sample C, permits brazing at much lower temperatures. This alloy has excellent flow characteristics while not contributing to either IGA (InterGranular Attach) or other base metal dilutions and is suited for joining thin sections as encountered with heat exchanger and honeycomb components.

The viscosity of the braze filler metal alloy paste can vary depending on the particular application it is to be used for. When the paste is to be packaged in a conventional squeeze tube, it can be controllably fed from the tube and positioned exactly where it is needed. For most applications, the braze filler metal alloy powder could be sized between 175 and 5 microns, preferably between 75 and 11 microns, and most preferably between 45 and 11 microns. The amount of braze filler metal alloy powder in the paste should be between 80 to 93 weight percent, preferably between 83 and 90 weight percent and most preferably between 86 and 90 weight percent based on the weight of the paste. The amount of braze filler metal alloy powder in the paste will generally be greater for a fine powder size. For example, for a course powder size of $-120$ to 325 Tyler mesh, the preferred amount of powder in the paste would be bout 88% by weight while for a fine powder size of $-200$ Tyler mesh to $11\mu$ the preferred amount of the powder in the paste would be about 90% by weight. The gel component of this paste should be between 6 and 20 weight percent, preferably between 10 and 14 weight percent and most preferably between 10 and 12 weight percent based on the weight of the paste. The gel component of the paste comprises water, preferable di-ionized water, in an amount of between 70 and 90 weight percent and preferably in an amount between 78 and 80 weight percent based on the weight of the gel; at least one dispersant in an amount between 7 and 27 weight percent and preferably in an amount between 18 and 22 weight percent and most preferably about 20 weight percent based on the weight of the gel; and a binder in an amount between 1 and 5 weight percent and preferably between 1.5 and 2.0 weight percent based on the weight of the gelo A preferred gel component would be 83 to 85 weight percent water, 12 to 15 weight percent hexylene glycol, and balance a binder such as hydroxypropyl-cellulose in an amount between 2 and 3 weight percent based on the weight of the gel.

EXAMPLE

A braze filler metal alloy paste was prepared by first preparing a gel containing 78 weight percent water, 10 weight percent mineral oil, 10 weight percent glycerin with the balance sodium carboxymethyl-cellulose. Nickel-based braze filler metal powders, sized about 11 to 75 microns were mixed into the gel to form a paste having 90 weight percent metal powders based on the weight of the paste. The paste was fed into a flexible tube having an opening that was closed by a removable cap. To dispense the paste, the cap on this tube was removed and the tube was squeezed. The paste was then fed from the opening at a controlled rate so that it could be deposited on a selected area for brazing parts together.

The braze filler metal alloy paste of this invention is non-hazardous to the environment and can be used in applications where a braze alloy is required to secure parts together. Though the invention has been described with respect to preferred embodiments thereof, many variations and modifications will become apparent to those skilled in the art. It is therefore the intention that the appended claims be interpreted as broadly as possible in view of the prior art to include all such variations and modifications.

What is claimed:

1. A brazing paste which comprises at least one braze filler metal or metal alloy powder homogeneously dispersed throughout an aqueous gel, said braze filler metal alloy powder present in an amount from 80 to 93 weight percent based on the weight of the paste with the remainder the aqueous gel, and wherein said aqueous gel comprises from 70 to 90 weight percent water based on the weight of the gel, 7 to 27 weight percent of at least one dispersant based on the weight of the gel and 1 to 5 weight percent of at least one binder based on the weight of the gel.

2. The brazing paste of claim 1 wherein said braze filler metal alloy powder is present in an amount from 83 to 90 weight percent based on the weight of the paste; said water is present in an amount from 78 to 80 weight percent based on the weight of the gel; said dispersant is present in an amount from 18 to 22 weight percent based on the weight of the gel; and said binder is present in an amount from 1.5 to 2.0 weight percent based on the weight of the gel.

3. The brazing paste of claim 1 wherein the at least one dispersant is selected from the group consisting of mineral oil, glycerin, menhaden fish oil, glycerol trioleate and hexylene glycol.

4. The brazing paste of claim 1 wherein the at least one binder is selected from the group consisting of hydroxypropyl-cellulose, sodium carboxymethyl-cellulose and hydroxyethyl-cellulose.

5. The brazing paste of claim 1 wherein said braze filler metal alloy powder is selected from the group consisting of nickel-based braze filler metals, cobalt-based braze filler metals, precious metal braze filled metals such as gold, silver and palladium.

6. The brazing paste of claim 2 wherein the at least one dispersant is selected from the group consisting of mineral oil, glycerin, menhaden fish oil, glycerol trioleate and hexylene glycol.

7. The brazing paste of claim 2 wherein the at least one binder is selected from the group consisting of hydroxypropyl-cellulose, sodium carboxymethyl-cellulose and hydroxyethyl-cellulose.

8. The brazing paste of claim 2 wherein said braze filler metal alloy powder is selected from the group consisting of nickel-based braze filler metals, cobalt-based braze filler metals, and precious metals such as gold, silver and palladium.

9. The brazing paste of claim 8 wherein the at least one dispersant is selected from the group consisting of mineral oils glycerin, menhaden fish oils glycerol trioleate and hexylene glycol.

10. The brazing paste of claim 9 wherein the at least one binder is selected from the group consisting of hydroxypropyl-cellulose, sodium carboxymethyl-cellulose and hydroxyethyl-cellulose.

11. The brazing paste of claim 1 wherein said braze filler metal alloy powder is a nickel-based braze filler metal present in an amount of 83 to 90 weight percent based on the weight of the paste; said dispersant is glycerine and mineral oil present in an amount of 18 to 22 weight percent based on the weight of the gel; said binder is sodium carboxymethyl-cellulose present in an amount of 1.5 to 2 weight percent based on the weight of the gel; and water is present in an amount of 78 to 80 weight percent based on the weight of the gel.

12. The brazing paste of claim 1 wherein said braze filler metal allow powder is a cobalt-based braze filler metal present in an amount of 86 to 90 weight percent based on the weight of the paste; said dispersant is glycerine and mineral oil present in an amount of 18 to 22 weight percent based on the weight of the gel; said binder is sodium carboxymethyl-cellulose present in an amount of 1.5 to 2.0 weight percent based on the weight of the gel; and water is present in an amount of 78 to 80 weight percent based on the weight of the gel.

13. The brazing paste of claim 11 wherein said nickel-based braze filler metal is present in an amount of about 86 to 90 weight percent based on the weight of the paste; said dispersant is present in an amount of about 20 weight percent based on the weight of the gel; said binder is present in an amount of about 2 weight percent based on the weight of the gel; and water is present in an amount of between 78 to 80 weight percent based on the weight of the gel.

14. The brazing paste of claim 12 wherein said cobalt-based braze filler metal is present in an amount of about 86 to 90 weight percent based on the weight of the paste; said dispersant is present in an amount of about 20 weight percent based on the weight of the gel; said binder is present in an amount of about 2 weight percent based on the weight of the gel; and water is present in an amount of between 78 to 80 weight percent based on the weight of the gel.

15. The brazing paste of claim 1 wherein said paste is contained within a flexible tube container having an opening closed by a cap.

16. The brazing paste of claim 2 wherein said paste is contained within a flexible tube container having an opening closed by a cap.

17. The brazing paste of claim 6 wherein said paste is contained within a flexible tube container having an opening closed by a cap.

18. The brazing paste of claim 7 wherein said paste is contained within a flexible tube container having an opening closed by a cap.

19. The brazing paste of claim 13 wherein said paste is contained within a flexible tube container having an opening closed by a cap.

20. The brazing paste of claim 14 wherein said paste is contained within a flexible tube container having an opening closed by a cap.

* * * * *